April 7, 1931.  J. A. HARDING  1,800,141
AUTOMATIC SHIFT
Filed Oct. 15, 1930    3 Sheets-Sheet 1

J. A. Harding, INVENTOR
BY Victor J. Evans ATTORNEY

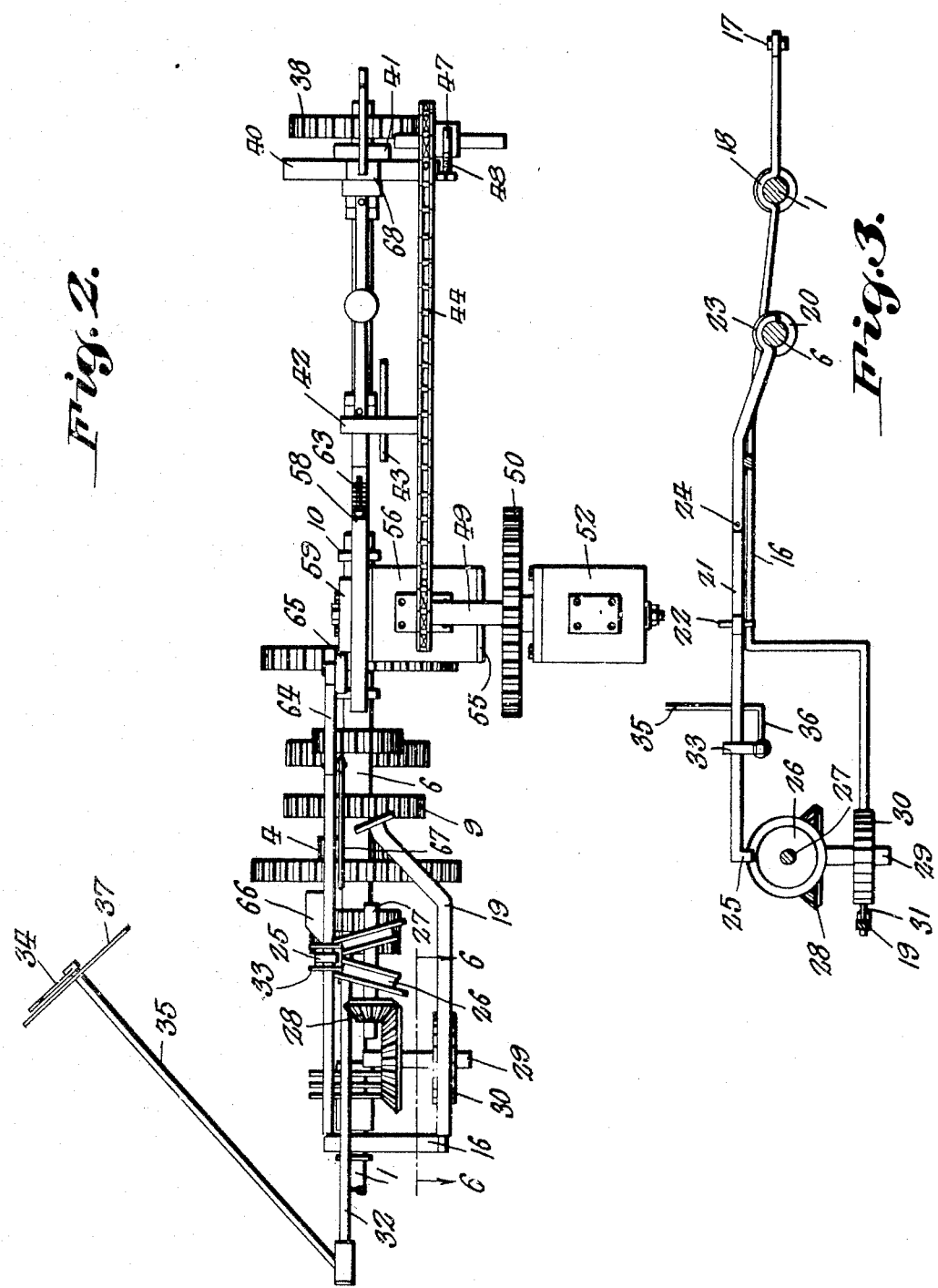

April 7, 1931.  J. A. HARDING  1,800,141
AUTOMATIC SHIFT
Filed Oct. 15, 1930  3 Sheets-Sheet 3
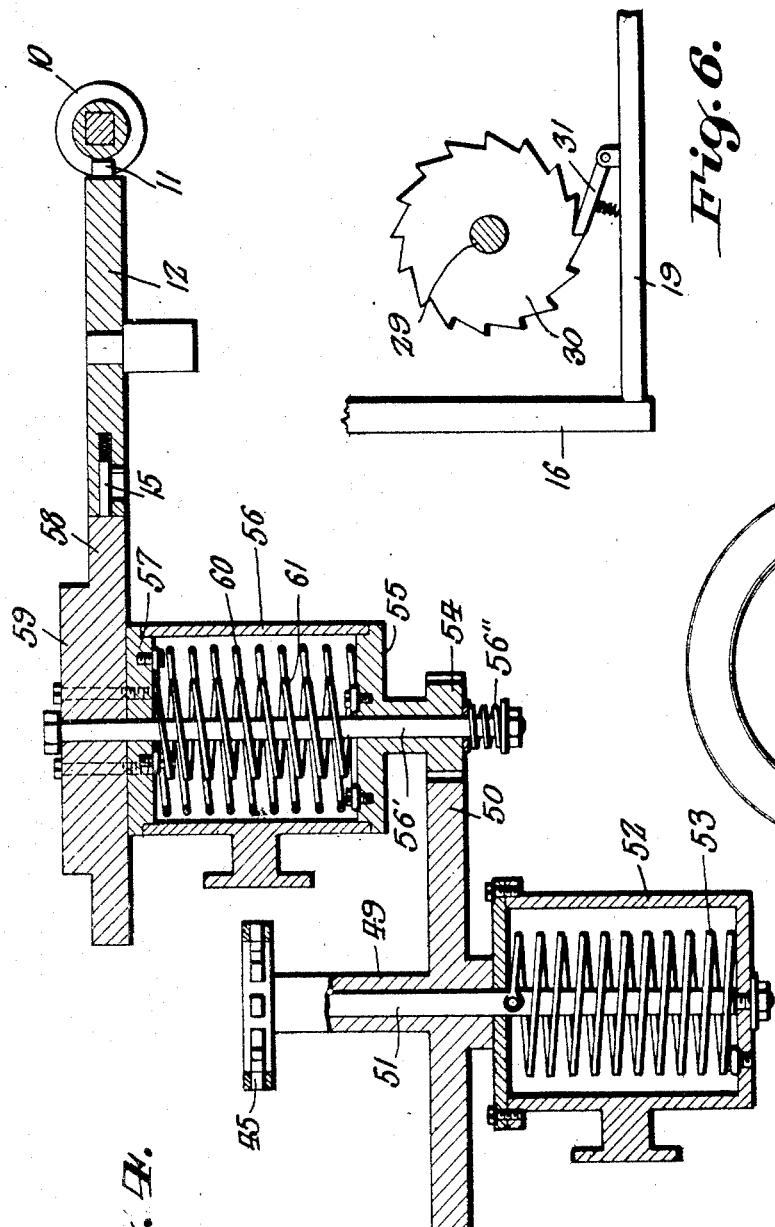
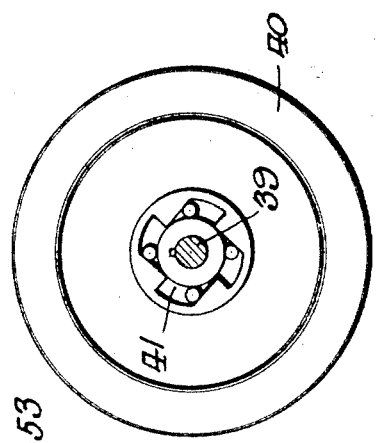
J. A. Harding, INVENTOR
BY Victor J. Evans
ATTORNEY Patented Apr. 7, 1931

1,800,141

UNITED STATES PATENT OFFICE

JOSEPHINE A. HARDING, OF ELMHURST, NEW YORK

AUTOMATIC SHIFT

Application filed October 15, 1930. Serial No. 488,970.

This invention relates to automatic shifting mechanism for automobiles and the like, the general object of the invention being to provide means for automatically shifting the gears of a vehicle from low speed to intermediate and from intermediate into high, and from high to neutral by means controlled by the speed of the vehicle, with means for moving the gears into reverse and into low speed by the operation of the clutch pedal.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is an elevation of Figure 1.

Figure 3 is a section on line 3—3 of Figure 1.

Figure 4 is a section on line 4—4 of Figure 1.

Figure 5 is a section on line 5—5 of Figure 1.

Figure 6 is a section on line 6—6 of Figure 2.

Figure 1:
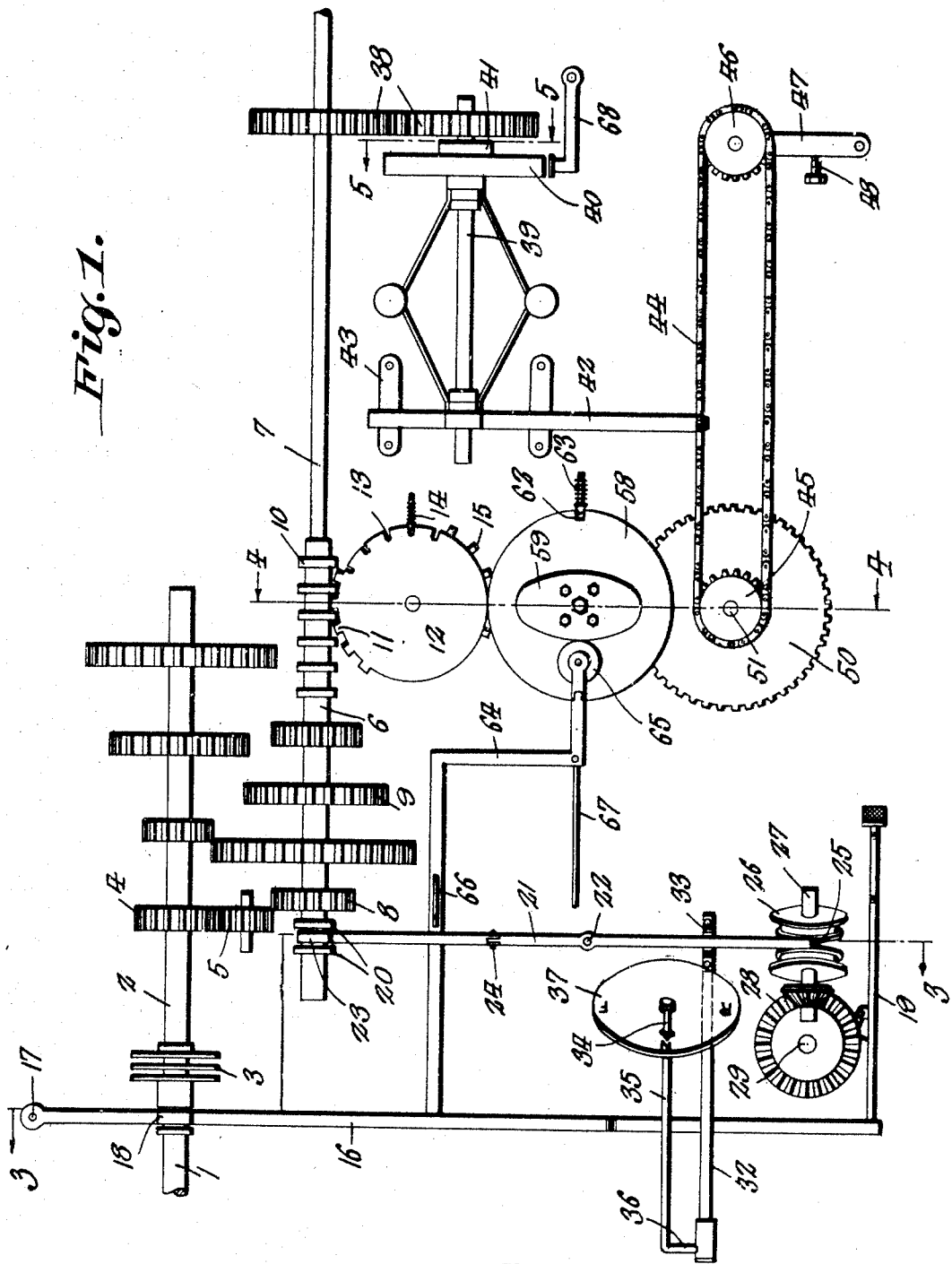
Figure 1 is a diagrammatic plan view of the invention.

In these drawings, the numeral 1 indicates the engine shaft and the numeral 2 the gear carrying shaft which is adapted to be connected to the shaft 1 by means of the usual or any type of clutch, shown at 3. The shaft 2 carries the gears 4, one of which meshes with the idle gear 5 which forms a part of the reverse gearing. A shaft 6 is slidably but non-rotatably mounted on the shaft 7 and the shaft 6 carries the reverse gear 8 and the gears 9, the gear 8 being adapted to mesh with the gear 5 to impart a reverse motion to the vehicle and the gears 9 being adapted to mesh with the gears on shaft 2, except the gear 4, which meshes with the gear 5, to impart forward speeds to the vehicle. Collars 10 are formed on the shaft 6 and are adapted to be engaged by the teeth 11 formed on part of the circumference of a wheel 12. Another part of the circumference of this wheel 12 is formed with the notches 13, any one of which is adapted to be engaged by a spring plunger 14 and another portion of the circumference of the wheel 12 carries the spring pressed teeth 15. A clutch rod 16 is pivotally supported at one end, as shown at 17, and has a part 18 for fitting in a groove in a part of the clutch 3 and the free end of the clutch rod is engaged by the clutch pedal 19 so that by depressing the pedal, the rod 16 will disengage the clutch 3.

A pair of collars 20 is formed on the forward end of the shaft 6 and a bar 21, pivotally supported intermediate its ends, as shown at 22, has a substantially hook-shaped part 23 at its end which rests on the shaft 6 between the collars. The bar 21 is also formed in sections which are hinged together, as at 24, so that the section carrying the hook 23 can be lifted, as will be hereinafter described. The other end of the bar is provided with a depending part 25 for engaging cam grooves in the cam wheels 26 arranged on the shaft 27. The two cam wheels slope in opposite directions so that one wheel will swing the bar 21 on its pivot 22 in one direction and the other wheel will swing the bar 21 in an opposite direction.

The shaft 27 is connected by the gears 28 with a shaft 29 which has a ratchet wheel 30 thereon which is engaged by a spring pressed dog 31 on the clutch pedal 19 when the same is pressed forwardly. These parts are so arranged that when the clutch pedal is pressed forwardly, the cam wheels will be rotated a half revolution. When the pedal is released and moves back to its normal position, the dog 31 simply ratchets over the ratchet 30 without moving the parts and then when the pedal is again pressed forwardly, the cam wheels are given another half revolution, which brings them back to their first position. The depending part 25 of the bar or lever 21 is moved into engagement with either cam wheel by a sliding member 32 having a pair of spring parts 33 thereon which straddle the bar or lever and said member 32 is actuated from a finger 34 attached to a shaft 35 which is connected to the member 32, as shown generally at 36, so that movement of the finger to the left will cause the part 25 of the lever 21 to engage the rear cam wheel 26 so that the lever 21 will move the shaft 6 to a position where the gear 8 will mesh with the idle gear 5 to place the gears in a position to reverse the vehicle and when the finger is moved to the right, the lever 21 will be shifted to a position to move the shaft 6 rearwardly to place the large gear 9 in mesh with the small gear 4, so that the vehicle will be in low or first speed. The finger operates over a dial 37 which may be placed on the steering wheel or over part of the steering wheel and the dial is suitably marked, as shown in Figure 1, to indicate reverse and forward speeds and neutral.

The driven shaft 7 is connected by the gears 38 to the shaft 39 of a governor, the fly wheel 40 of which is rotatably mounted on the shaft 39 and is connected with the shaft by an over-run clutch 41 which is so arranged that the governor will not operate when the vehicle is being reversed, but will operate when the vehicle is moving forwardly. The sliding part of the governor is connected to a sliding member 42 provided with the supports 43 and having one end connected with an endless chain 44 which passes over the sprockets 45 and 46. The shaft of the sprocket 46 is carried by a pivoted arm 47 which is limited in its movement toward the other sprocket 45 by a set screw 48 so that the tension of the chain can be adjusted. The sprocket 45 is connected with a hub 49 of a gear 50, the hub being connected to a shaft 51 which passes through a housing 52 fastened to a part of the frame of the vehicle. A spring 53 is located in the housing and has one end connected to the shaft and its other end to the housing and said spring is wound in a direction which will resist the movement of the chain by the sliding member 42 under the contracting action of the governor. The gear 50 meshes with a pinion 54, the hub of which is connected with the end 55 of a housing 56, the other end 57 of which is fastened to a wheel 58 which is formed with a substantially oval-shaped cam 59. The ends 55 and 57 are countersunk in the ends of the housing and are rotatably arranged with respect to the housing and springs 60 and 61 are located in the housing and have their ends connected with the end pieces 55 and 57. The spring 61 is wound in an anti-clockwise direction and the spring 60 in a clockwise direction. A bolt 56' passes through the parts and connects them together and has a spring 56'' between its nut and the pinion 54. The wheel 58 contacts the wheel 12 and said wheel 58 has a pair of oppositely arranged notches 62 therein. A latch plunger 63 is adapted to engage either one of the notches and these notches are also adapted to engage the spring pressed teeth 15 during the movement of the wheel 58. A sliding member 64 has a roller 65 at one end thereof for engaging the cam 59 and the other end of the member engages the clutch rod 16. Said member is also formed with a raised part 66 for engaging the hinged part of the lever 21 to raise the hook 23 above the collars 20 on the shaft 6 and said member 64 is connected with a valve of the carburetor of the vehicle by connections 67. This valve is normally open and does not interfere with the flow of gas through the regular valve of the carbureter until it is partly closed by the forward movement of the member 64 under the action of the cam 59.

A brake member 68 is connected with the brake mechanism of the vehicle and will engage the fly wheel 40 of the governor when the brakes are applied so as to check the movement of the governor.

From the foregoing it will be seen that when it is desired to reverse the vehicle, the pedal 19 is depressed after the finger 34 has been adjusted to reversing position. This movement of the finger will cause the parts actuated thereby to shift the lever 21 to a position where its bent end 25 will engage the groove of the rear cam wheel 26. When the pedal is depressed, the clutch lever 16 will slip the clutch 3 and the forward movement of the pedal will cause the dog 31 to partly rotate the shaft 30 and the shaft 29, so that the gears 28 will rotate the shaft 27 a half turn and thus cause the rear cam wheel 26 to shift the lever 21 to a position where it will move the shaft 6 to cause the gear 8 to mesh with the idle gear 5, which places the parts in reverse. Then by releasing the pedal, the clutch is engaged and the car moves backwardly. As before stated, the overrun clutch 41 is disconnected from the shaft 39 during this reverse movement so that the governor is not operated. When the car is to be stopped, the pedal is again depressed, which releases the clutch and again rotates the cam wheels a half turn so that the lever 21 moves the shaft 6 into neutral position, with the gear 8 out of mesh with the gear 5. When the vehicle is to be moved forwardly, the finger 34 is turned to the right, which causes the parts attached thereto to shift the lever 21 to a position over the front cam wheel. Then the pedal is depressed, which releases the clutch, as before described, and turns the cam wheels a half turn so that the lever 21 is caused to move the shaft 6 to a position where the large gear on said shaft 6 will engage the small gear on shaft 2, which places the gears in first speed. The pedal is then released so that the clutch 3 connects the engine shaft 1 with the shaft 2 and the car moves forwardly at first speed. As the over-run clutch 41 will engage the shaft 39 as the vehicle is moving forwardly, the governor shaft is rotated from the shaft 7 through the gears 38 and as the car picks up speed, the governor contracts, thus causing the member 42 to move the chain 44 over the sprockets and the turning movement of the sprocket 45 is communicated to the gear 50 which turns the pinion 54 and the end piece 55 of the housing 56 so that the springs in said housing are wound. The latch 63, engaging a notch 62 in the wheel 58, holds said wheel 58 against turning movement until the springs in the housing 56 are wound sufficiently to overcome the holding action of the latch, when the wheel 58 is turned by the stored up energy in the springs. The wheel is given a half turn and stops when the latch 63 engages the other notch 62 in said wheel, for after this half turn, the springs in the housing 56 do not have sufficient energy to counteract the holding action of the latch. During this half turn of the wheel 58, the cam 59 forces the member 64 forwardly, which causes the rod 16 to release the clutch 3 and the connection 67 to partly close the auxiliary valve of the engine, thus slowing up the engine, and this forward movement of the member 64 also causes the raised part 66 to lift the hinged part of the lever 21 so that its hook part 23 is lifted above the collars 20. As the notch 62 passes a spring pressed tooth 15 in the wheel 12, the tooth will enter the notch and thus cause the wheel 12 to move with the wheel 58 so that the teeth 11 of the wheel 12, engaging some of the collars 10 on the shaft 6, will impart sliding movement to the shaft 6 so that the intermediate gears on the shafts 2 and 6 will be brought into mesh and the large gear on the shaft 6 will be moved out of mesh with the small gear on the shaft 2. During the continued movement of the wheel 58, the tooth 15 moves out of the notch so that the wheel 12 comes to rest by the latch plunger 14 engaging a notch 13 therein and as the roller 65 is now engaging a reduced part of the cam 59, the member 64 moves rearwardly so that the clutch 3 engages the shaft 1 with the shaft 2 and the connection 67 opens the auxiliary valve of the carbureter so that the engine picks up speed and the car moves forwardly at an intermediate speed. As the car again picks up speed, the before mentioned operation is repeated so that the high speed gears are placed into mesh. Due to the increased tension of the spring 53 when the shift is being made from intermediate speed to full speed, the car will have to move much faster to make the mechanism work than it did when shifting from first to intermediate. It will, of course, be understood that any number of intermediate speeds can be provided for by attaching other intermediate gears to the shafts 2 and 6. If the car is driven up a hill or through sand, mud, or the speed is otherwise reduced, the governor will resist, which will allow the spring 53 to unwind and this unwinding action will wind the counterclockwise spring in housing 56, thereby reversing the action of the wheels 12 and 58, and cause said wheel 12 to move the shaft 6 forwardly so that the car is shifted from high to intermediate and from intermediate to low, if the reduction of speed is sufficient to permit the parts to move to low speed position. However, the change of speed will have to be sufficient to release the locking plunger, as this plunger will hold the shift wheel until dislodged by an opposing force. If the brakes are applied, the motion of the car quickly decreases and the brake 68, engaging the fly wheel 40 of the governor, checks the speed of the governor and thus the shaft 6 is moved to disengage all the gears so that the parts are in a neutral position. Thus it is simply necessary for the operator to apply the brakes in order to stop the car and place the gears in a neutral position.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In a motor vehicle including the clutch and transmission means, a governor driven from the driven shaft of the transmission means, means operated by the governor for shifting the gears from first speed to higher speeds and vice versa automatically and in accordance with the speed of the engine, means associated with the first mentioned means for releasing the clutch and reducing the flow of gas to the engine during the shifting operation, manually operated means for placing the transmission means in reverse and in low speed, the last mentioned means comprising a gear shift lever, a pair of cams for shifting the same, means for rotating the cams from the clutch pedal and manually operated means for placing the shift lever into either the reversing cam or the first speed cam.

2. In a motor vehicle including its clutch and transmission means, a sliding member connected with the driven shaft of the transmission means and carrying one set of the transmission gears, a partially toothed wheel engaging projections on the sliding member, spring pressed teeth carried by a part of said wheel, a spring latch engaging notches in said wheel, a second wheel contacting the first wheel and having notches therein for receiving the spring pressed teeth of the first wheel, a spring plunger for engaging the notches of the second wheel, reversely wound springs connected with the second wheel, a member connected with said springs, a pinion on said member, a gear meshing with the pinion, a sprocket connected with said gear, a second sprocket, a chain passing over the sprockets, a governor, means operated by the contraction of the governor for moving the chain, a spring connected with the sprocket carrying gear for resisting the movement of the chain, means for operating the governor from the transmission shaft of the transmission means, a cam on the second wheel and means operated thereby when the wheel is turned for releasing the clutch and for reducing the flow of gas to the engine.

3. In a motor vehicle including its transmission means and clutch, a sliding member connected with one of the transmission shafts and carrying one set of the transmission gears, projections on said sliding member, a partially toothed wheel having its teeth engaging the projections, a second wheel, means whereby the second wheel will move the first wheel a distance to shift the member to place a gear thereon into or out of mesh with a gear of the other set, spring means connected with the second wheel, gears for winding the springs, governor operated means for moving one of the gears, a spring for resisting such movement, means for operating the governor from the before mentioned transmission shaft, means for preventing movement of the second wheel until the spring means have been wound to a certain degree, means operated by the movement of the second wheel for first releasing the clutch and reducing the flow of gas to the engine and then engaging the clutch and increasing the flow of gas to the engine and manually operated means for moving the transmission means into reverse and first speed.

4. In a motor vehicle including its transmission means and clutch, a sliding member connected with one of the transmission shafts and carrying one set of the transmission gears, projections on said sliding member, a partially toothed wheel having its teeth engaging the projections, a second wheel, means whereby the second wheel will move the first wheel a distance to shift the member to place a gear thereon into or out of mesh with a gear of the other set, spring means connected with the second wheel, gears for winding the springs, governor operated means for moving one of the gears, a spring for resisting such movement, means for operating the governor from the before mentioned transmission shaft, means for preventing movement of the second wheel until the spring means have been wound to a certain degree, means operated by the movement of the second wheel for first releasing the clutch and reducing the flow of gas to the engine and then engaging the clutch and increasing the flow of gas to the engine, manually operated means for moving the transmission means into reverse and first speed and means associated with the vehicle braking system for checking the movement of the governor when the brakes are applied.

In testimony whereof I affix my signature.

JOSEPHINE A. HARDING.